United States Patent
Gross et al.

(10) Patent No.: US 10,399,524 B2
(45) Date of Patent: Sep. 3, 2019

(54) METHOD FOR DETERMINING AN IMPACT INTENSITY

(71) Applicant: Robert Bosch GmbH, Stuttgart (DE)

(72) Inventors: Marcus Gross, Farmington Hills, MI (US); Christian Ohl, Pfullingen (DE); Elvira Lehr, Northville Township, MI (US); Hans-Joerg Faisst, Kirchentellinsfurt (DE); Michael Roelleke, Leonberg-Hoefingen (DE); Josefine Ladda, Suzhou (CN); Stefan Schuster, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/080,190

(22) PCT Filed: Feb. 22, 2017

(86) PCT No.: PCT/EP2017/054095
§ 371 (c)(1),
(2) Date: Aug. 27, 2018

(87) PCT Pub. No.: WO2017/174256
PCT Pub. Date: Oct. 12, 2017

(65) Prior Publication Data
US 2019/0054879 A1    Feb. 21, 2019

(30) Foreign Application Priority Data
Apr. 4, 2016 (DE) .................. 10 2016 205 545

(51) Int. Cl.
*B60R 21/0132* (2006.01)
*G08B 25/00* (2006.01)
(Continued)

(52) U.S. Cl.
CPC ........ *B60R 21/0132* (2013.01); *G08B 25/009* (2013.01); *G08B 25/016* (2013.01);
(Continued)

(58) Field of Classification Search
CPC ........ B60R 21/0132; B60R 2021/0027; B60R 2021/01325; G08B 25/009; G08B 25/016; G08B 25/08
See application file for complete search history.

(56) References Cited

U.S. PATENT DOCUMENTS 5,969,598 A * 10/1999 Kimura ................... B60R 21/01
                                                              180/274
7,119,669 B2    10/2006 Lundsgaard et al.
(Continued)

FOREIGN PATENT DOCUMENTS

DE    102008018868 A1    10/2008
DE    102014217156 A1    3/2015
(Continued)

OTHER PUBLICATIONS

International Search Report for PCT/EP2017/054095, dated May 29, 2017.

*Primary Examiner* — Mohamed Barakat
(74) *Attorney, Agent, or Firm* — Norton Rose Fulbright US LLP; Gerard Messina

(57) ABSTRACT

A method for generating a signal representing an impact intensity including the steps: receiving at least three signals, which represent respectively accelerations in different spatial directions; calculating a direction-independent variable from the three signals; ascertaining an integrated measurand of the direction-independent variable over a time window; generating a signal representing an impact intensity on the basis of the ascertained integrated measurand.

13 Claims, 3 Drawing Sheets

(51) Int. Cl.
*G08B 25/01* (2006.01)
*B60R 21/00* (2006.01)
*G08B 25/08* (2006.01)

(52) U.S. Cl.
CPC ............ *B60R 2021/0027* (2013.01); *B60R 2021/01325* (2013.01); *G08B 25/08* (2013.01)

(56) References Cited

U.S. PATENT DOCUMENTS

| | | | |
|---|---|---|---|
| 9,142,128 B2* | 9/2015 | Shin | G08G 1/096791 |
| 2007/0219692 A1* | 9/2007 | Kuhn | B60R 21/0132 |
| | | | 701/45 |
| 2012/0310485 A1* | 12/2012 | Lang | B60R 21/0132 |
| | | | 701/46 |
| 2016/0075294 A1* | 3/2016 | Koenig | B60R 21/0132 |
| | | | 701/46 |

FOREIGN PATENT DOCUMENTS

| | | |
|---|---|---|
| WO | 2014094743 A2 | 6/2014 |
| WO | 2014177891 A1 | 11/2014 |

* cited by examiner

METHOD FOR DETERMINING AN IMPACT INTENSITY

FIELD

The present invention relates to a method for determining an impact intensity.

BACKGROUND INFORMATION

Various methods for conventional crash detection are available in the related art. For this purpose, one-dimensional acceleration values are received and evaluated. When defined threshold values are exceeded, passive restraining devices may be activated.

SUMMARY

The present invention relates to a method for generating a signal representing an impact intensity. An example embodiment of the method includes the steps:
receiving at least three signals, which represent respectively accelerations in different spatial directions;
calculating a direction-independent variable from the three signals;
ascertaining an integrated measurand of the direction-independent variable over a time window;
generating a signal representing an impact intensity from the ascertained integrated measurand.

This method may be advantageously implemented in a vehicle in order to detect an accident.

An advantage of the example method is that an impact intensity is determinable independently of the direction of acceleration. The three signals represent accelerations in different spatial directions, a three-dimensional space being covered by the spatial directions. In the simplest case, the vectors representing the spatial directions stand respectively in pairs perpendicularly one upon the other. When ascertaining the direction-independent variable from the three signals, a direction-independent scalar is formed. The impact intensity is understood as the intensity of an impact. In accordance with the present invention, impact intensity is understood in particular as the impact intensity on a vehicle, for example by an obstacle, another vehicle, a pedestrian, a shopping cart or a piece of sports equipment such as a baseball bat.

If the method is implemented for example in a device that is able to detect three accelerations in different spatial directions, then the method ascertains an impact intensity independently of the installation position and the installation orientation of the acceleration sensor. The orientation of the device or of the spatial directions or measuring directions may also be changed in operation. This makes it possible to create a user-friendly product that is insusceptible to error.

In one advantageous development of the present invention, the direction-independent variable is adapted by subtracting a value representing the gravitational acceleration from the direction-independent variable.

This specific embodiment has the advantage of being able to take the gravitational acceleration into account in a very simple manner and of ensuring that no excessively high impact intensities are ascertained due to gravitational acceleration. The gravitational acceleration is in this specific embodiment subtracted in a direction-independent manner, that is, it likewise corresponds to a scalar.

In another specific embodiment of the present invention, at least one of the three signals is adapted in that a value representing the gravitational acceleration is subtracted from at least one of the three signals.

This specific embodiment offers the advantage of making it possible to take gravitational acceleration into account in a direction-dependent manner. Depending on the orientation of the spatial directions, the gravitational acceleration may be subtracted from the three signals in different proportions. A direction-dependent consideration allows for a more exact determination of the impact intensity.

In one advantageous specific embodiment of the present invention, the three signals are low-pass filtered.

This specific embodiment offers the advantage that high-frequency vibrations cannot result in distortions of the impact intensity. Since an impact intensity is not necessarily to be ascertained in proximity of sensors measuring accelerations, lower frequencies are better suited for a reliable measurement. If the method is carried out for example in a separate device, which is mounted in a vehicle and which is to ascertain the impact intensity on the vehicle (not the device), then light impacts with hard objects on the device would cause very high acceleration peaks. In order to control this source of interference, it is possible to filter out respective acceleration peaks.

In one advantageous specific embodiment of the present invention, the integrated measurand is ascertained continuously.

This specific embodiment offers the advantage that no dead times arise, in which no measurement is carried out and in which a possible impact could be missed. Since the scan occurs in digitized and time-discrete fashion, continuous here refers to the smallest possible sampling. The ascertainment of the integrated measurand thus occurs quasi in time-discrete continuous fashion.

In one advantageous specific embodiment of the present invention, the integrated measurand is compared with a predefined threshold value.

This specific embodiment offers the advantage of allowing for a more exact determination of the impact intensity and of preventing false alarms.

In one advantageous specific embodiment of the present invention, a transmitting device is activated for transmitting the signal representing an impact intensity to an external receiving device and/or a mobile terminal.

This specific embodiment offers the advantage that a signal representing the impact intensity is able to be received and evaluated at a location that differs from the location of the impact. Thus, it is possible for an impact to be received simultaneously by one or multiple persons or devices, it being possible for the persons or devices to be in any location. The transmission may occur for example via a mobile telephone transmitting device, a radio transmitting device, an Internet transmitting device or a Bluetooth transmitting device.

Additionally, a computer program is provided in accordance with the present invention, which is designed to implement all steps of the example method. Furthermore, a machine-readable storage medium is provided, on which the computer program is stored.

Additionally, an electronic control unit is provided, which is designed to implement all steps of the example method.

Furthermore, a device is provided, comprising the electronic control unit and a triaxial acceleration sensor, which is able to detect accelerations in three different spatial directions.

In one advantageous specific embodiment of the device, this device additionally has a transmitting device for transmitting the signal representing an impact intensity to an external receiving device and/or a mobile terminal.

In one preferred specific embodiment of the device, the electronic control unit, the triaxial acceleration sensor and the transmitting device are situated in a common housing.

This makes it possible to produce a compact and portable device, which may be used for generating a signal representing an impact intensity. The device may be used for retrofitting and contributes toward an increased safety for its owner or for the occupants of the vehicle, in which a respective device is installed.

DETAILED DESCRIPTION OF EXAMPLE EMBODIMENTS

Figure 3:
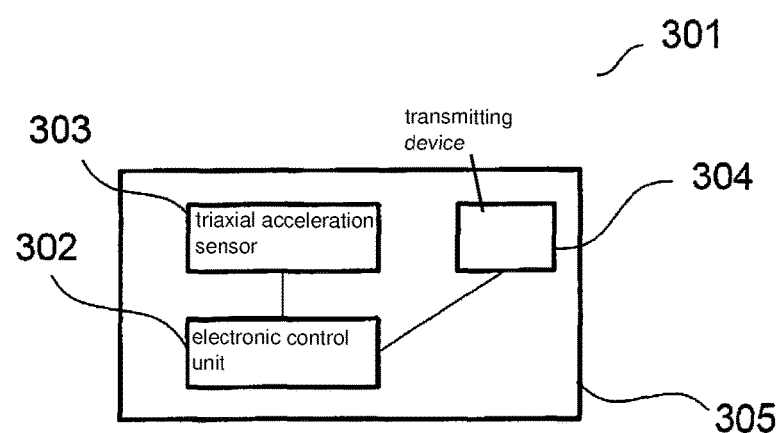
FIG. 3 shows a schematic construction of the device.

FIG. 3 shows one possible schematic construction of device 301. Device 301 comprises an electronic control unit 302, a triaxial acceleration sensor 303 and a transmitting device 304. The vectors representing measuring directions of sensor 303 stand respectively in pairs perpendicularly on one another. The various components 302, 303, 304 are situated in a common housing 305. Alternatively, however, it is also possible to accommodate the components 302, 303 and 304 in different housings.

Device 301 is suitable for a use in a vehicle and may be mounted there in different places. For example, in the trunk, in the glove compartment or, as in this exemplary embodiment, on the cigarette lighter. When mounting it on the cigarette lighter, it is advantageously possible to supply device 301 with voltage. In other exemplary embodiments, the voltage is provided by a separate voltage source such as a battery, for example. Device 301 is portable and may be used in any vehicle. In this exemplary embodiment, device 301 is suitable for use in motor vehicles, in particular in passenger cars. A use in other vehicles such as trucks or motorcycles is also possible, however.

Figure 1:
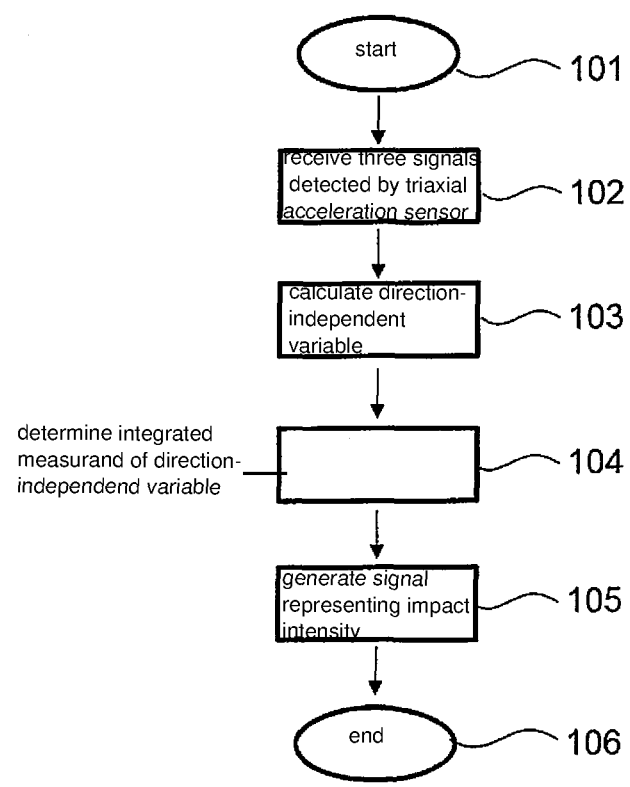
FIG. 1 shows a schematic method diagram.

The example method, which is schematically shown in FIG. 1, is implemented in electronic control unit 302. The method starts in step 101.

In step 102, three signals are received by control unit 302, which are detected by triaxial acceleration sensor 303. The signals correspond to respectively measured acceleration values in three different spatial directions. In this case, the vectors representing the spatial directions stand respectively in pairs perpendicularly one upon the other. Using the vectors and a common reference point, it would consequently be possible to form a Cartesian coordinate system. Other measuring directions of the triaxial acceleration sensor are also conceivable, as long as the configuration is known and a three-dimensional acceleration measurement is possible, as in this example.

Optionally, it is possible to subject the signals to low-pass filtering after they have been received. For this purpose, filters are particularly suitable, in which the frequency response characteristic bends off sharply after a defined limit frequency and consequently these frequencies are damped greatly. In this exemplary embodiment, a Chebyshev filter is used, in which the frequency limit is freely adjustable. 10 Hz has proven advantageous as a frequency limit for a reliable generation of a signal representing an impact intensity. Depending on the algorithm used, significantly deviating frequency limits are also conceivable however, which may be between 5 Hz and 400 Hz, for example.

As an alternative to filtering the received signals, it is also possible to receive already filtered signals. These may be prefiltered by a separate unit or may already be filtered by a sensor transmitting the signals. Furthermore, it is also possible for the algorithm to be adapted to unfiltered signals.

In step 103, a direction-independent variable is calculated from the three signals. For calculating the direction-independent variable, any mathematical method may be used by which it is possible to assign a one-dimensional value to a multi-dimensional data set. For example, the individual direction values may be added or a weighted and/or quadratic and/or cubic sum may be formed. All expedient algorithms are conceivable for calculating a one-dimensional value, which represents a variable representing direction-independent acceleration, from the at least three signals.

In this exemplary embodiment, the absolute value of the acceleration vector formable from the three low-pass filtered signals is calculated in step 103. The acceleration vector would result from the vectorial addition of the low-pass filtered signals in the three spatial directions. The formation of the absolute value occurs in accordance with the vector calculation by summing up the squares of the portions in the different spatial directions and by subsequently drawing the root of the ascertained sum.

Several methods may be used to compensate for a possible error due to the gravitational acceleration that was so far not taken into account. On the one hand, it is possible to adapt the direction-independent variable by subtracting a value representing the gravitational acceleration from the direction-independent variable. In this exemplary embodiment, a value representing the gravitational acceleration is subtracted from the formed absolute value. This value does not have to correspond exactly to the absolute value of the actual gravitational acceleration and may be adapted as desired.

Instead of taking the gravitational acceleration into account after calculating the direction-independent variable, it is also possible to take its influence into account prior to step 103. By continuously measuring the acceleration over a time period to be defined, which may amount to several milliseconds to several seconds or minutes, an offset should set in in at least one of the received signals as a function of the orientation of device 301. This offset representing a gravitational acceleration could be calculated vectorially after it has been ascertained or could be subtracted from the signals, which would likewise allow for a compensation of the gravitational acceleration. The compensation for the gravitational acceleration occurs preferably using the filtered signals, but may also be performed using the unfiltered signals. In the subsequent calculation of the direction-independent variable in step 103, the compensated signals would be entered in this case.

In step 104, an integrated measurand of the direction-independent variable is determined over a specific time window. In this exemplary embodiment, the absolute value is integrated, in which the influence of the gravitational acceleration was already taken into account. The integration occurs over a specific time window, the length of which may be varied depending on the application. A time window of approximately 60 ms has proven advantageous for a reliable generation of a signal representing an impact intensity. An integration is understood here as the summing up of discrete measured values. The precise number of the measured values to be summed up in this case depends on the integration time or the time window and the sampling of the measured values.

The ascertainment of the integrated measurand in this exemplary embodiment occurs in continuous fashion. Due to the time-discrete sampling and detection of the signals, continuous in this case is understood as a new calculation of the integrated measurand at the smallest possible sampling time.

In Step 105, a signal representing an impact intensity is generated on the basis of the ascertained integrated measurand. As a function of the magnitude of the integrated measurand, a signal is thus produced, which represents different impact intensities. The signal may contain for example crash index values in a range between 0 and 100. Definable ranges between 0 and 100 may then be assigned to different crash severities for example, such as parking dents or light or severe crashes.

Optionally, it is possible to perform various actions as a function of the generated signal. For example, a transmitting device 304 may be activated for transmitting the signal representing an impact intensity to an external receiving device and/or a mobile terminal. It is thus possible to report to an owner of the device an impact on his vehicle directly using a corresponding app on his smart phone or by SMS on his mobile telephone. A transmission of the signal to an emergency response center is also conceivable if an ascertained crash severity is so high as to necessitate the use of an ambulance.

The method ends with step 106. The method may be carried out as a loop so that the method starts again from the beginning after every run-through.

Figure 2:
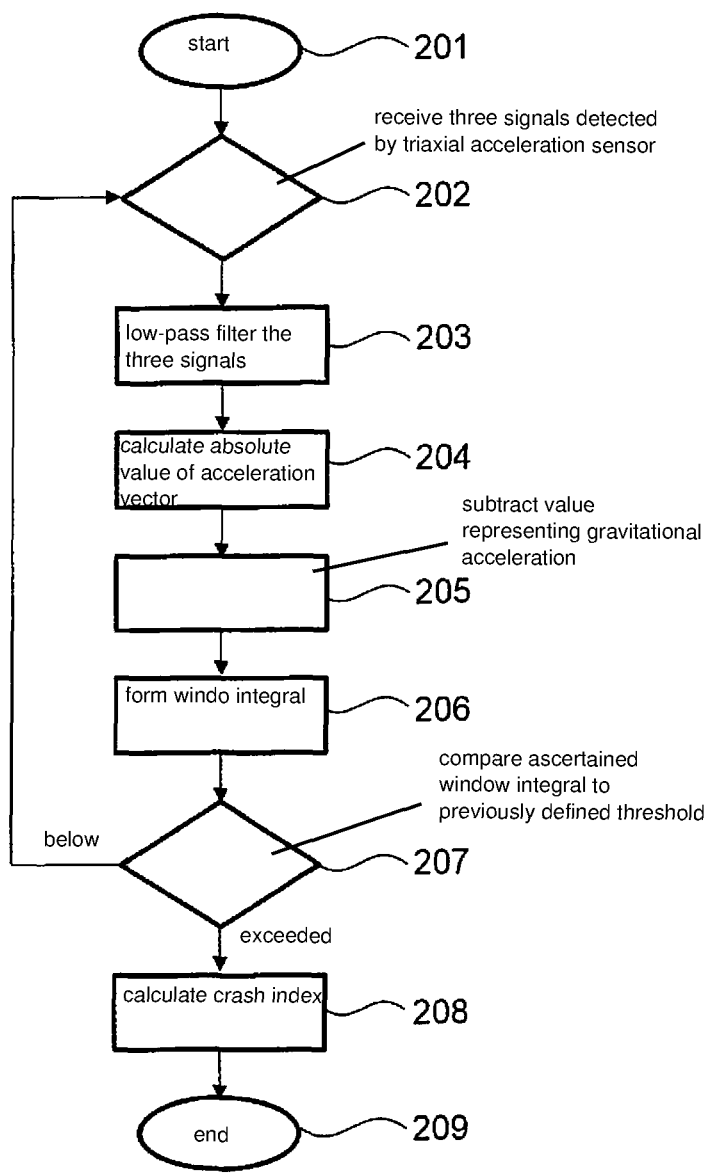
FIG. 2 shows another method diagram.

FIG. 2 shows another method diagram, which could be executed in electronic control unit 302. The method starts in step 201.

Step 202 corresponds to step 102, in which three signals are received by control unit 302, which are detected by triaxial acceleration sensor 303.

In step 203, the three signals are low-pass filtered using a parameterizable Chebyshev filter, whose frequency limit is set at 10 Hz.

In step 204, the absolute value of the acceleration vector resulting from the three low-pass filtered signals is calculated. The three low-pass filtered signals respectively represent time-dependent accelerations in different spatial directions. The vectorial addition of the three signals results in a time-dependent acceleration vector. The absolute value is formed from the latter by quadratic summation of the individual signals and subsequent root extraction from the sum.

Subsequently, in step 205, a value representing the gravitational acceleration is subtracted from this calculated absolute value, which may correspond to 1 g for example.

In step 206, a window integral is formed from the resulting absolute value. This is calculated continuously. Since the sampling of the acceleration occurs in time-discrete fashion, however, the window integral is formed in quasi-continuous fashion. The sampling occurs at approximately 2 ms so that a new window integral is also formed every 2 ms. A practical time window is 60 ms, for example, so that 30 values are added to form the window integral. The current measured value is taken up into the calculation for the next window integral, and the oldest measured value from the last window integral is no longer taken into account. In this exemplary embodiment, the quasi continuous window integral formation occurs by the repeated execution of the method. Precisely one window integral is thus formed per run-through.

The ascertained window integral is compared to a previously defined threshold in step 207. This may be a noise threshold for example, up to which no special incident is assumed and consequently no impact has taken place. If the currently calculated window integral falls below this noise threshold, then the method jumps back to step 202, in which the measured values are received anew.

If the noise threshold is exceeded by the ascertained window integral, a crash index is calculated in step 208. This crash index is made up of a calibratable scaling factor and the subtraction of the window integral and a threshold value. The threshold value corresponds in this exemplary embodiment to the noise threshold. The scaling factor is set to 1 for example and is multiplied by the difference between the window integral and the threshold value. In accordance with freely definable crash severity limits, which are indicated in crash index values from 0 to 100, it is possible to differentiate between parking dents and severe accidents.

A transmitting device 304 for transmitting the signal to an external receiving device and/or a mobile terminal may be activated as a function of the calculated crash index.

The method ends with step 209.

What is claimed is:

1. A method for a vehicle for generating a signal representing an impact intensity, comprising:
 receiving at least three signals, which represent respectively accelerations in different spatial directions;
 calculating a direction-independent variable from the three signals;
 adapting the direction-independent variable by subtracting a value representing gravitational acceleration from the direction-independent variable;
 ascertaining an integrated measurand of the direction-independent variable over a time window; and
 generating a signal representing an impact intensity from the ascertained integrated measurand.

2. The method as recited in claim 1, wherein the three signals are low-pass filtered.

3. The method as recited in claim 1, wherein the integrated measurand is ascertained continuously.

4. The method as recited in claim 1, wherein the integrated measurand is compared to a predefined threshold value.

5. The method as recited in claim 1, wherein a transmitting device is activated for transmitting the signal representing an impact intensity to: (i) an external receiving device, and/or (ii) a mobile terminal.

6. The method as recited in claim 1, wherein the integrated measurand is ascertained continuously at a discrete-time sampling rate.

7. The method as recited in claim 1, wherein a transmitting device is triggered based on the comparison to transmit the signal representing the impact intensity to at least one of: an external receiving device, or a mobile terminal.

8. A non-transitory machine-readable storage medium on which is stored a computer program for generating a signal representing an impact intensity, the computer program, when executed by a processor, causing the processor to perform:
 receiving at least three signals, which represent respectively accelerations in different spatial directions;
 calculating a direction-independent variable from the three signals;

adapting the direction-independent variable by subtracting a value representing gravitational acceleration from the direction-independent variable;

ascertaining an integrated measurand of the direction-independent variable over a time window; and generating a signal representing an impact intensity from the ascertained integrated measurand.

9. An electronic control unit for generating a signal representing an impact intensity, the electronic control unit designed to:

receive at least three signals, which represent respectively accelerations in different spatial directions;

calculate a direction-independent variable from the three signals;

adapting the direction-independent variable by subtracting a value representing gravitational acceleration from the direction-independent variable;

ascertain an integrated measurand of the direction-independent variable over a time window; and generate a signal representing an impact intensity from the ascertained integrated measurand.

10. A device, comprising:

an electronic control unit for generating a signal representing an impact intensity, the electronic control unit designed to:

receive at least three signals, which represent respectively accelerations in different spatial directions, calculate a direction-independent variable from the three signals, adapting the direction-independent variable by subtracting a value representing gravitational acceleration from the direction-independent variable;

ascertain an integrated measurand of the direction-independent variable over a time window, and generate a signal representing an impact intensity from the ascertained integrated measurand; and a triaxial acceleration sensor to detect the accelerations in the three different spatial directions.

11. The device as recited in claim 10, further comprising:

a transmitting device to transmit the signal representing an impact intensity to: (i) an external receiving device, and/or (ii) a mobile terminal.

12. The device as recited in claim 11, wherein the electronic control unit, the triaxial acceleration sensor, and the transmitting device are situated together in a common housing.

13. A method for a vehicle for generating a signal representing an impact intensity, comprising:

receiving at least three signals, which represent respectively accelerations in different spatial directions;

adapting at least one of the three signals by subtracting a value representing gravitational acceleration from the at least one of the three signals;

calculating a direction-independent variable from the three signals;

ascertaining an integrated measurand of the direction-independent variable over a time window; and generating a signal representing an impact intensity from the ascertained integrated measurand.

\* \* \* \* \*